(12) United States Patent
Li et al.

(10) Patent No.: US 12,068,863 B2
(45) Date of Patent: Aug. 20, 2024

(54) FEEDBACK MESSAGE SENDING METHOD AND TERMINAL DEVICE

(71) Applicant: VIVO MOBILE COMMUNICATION CO., LTD., Guangdong (CN)

(72) Inventors: Na Li, Guangdong (CN); Xiaodong Shen, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 380 days.

(21) Appl. No.: 17/512,881

(22) Filed: Oct. 28, 2021

(65) Prior Publication Data
US 2022/0052799 A1 Feb. 17, 2022

Related U.S. Application Data

(63) Continuation of application No. PCT/CN2020/087543, filed on Apr. 28, 2020.

(30) Foreign Application Priority Data

Apr. 30, 2019 (CN) .................. 201910365514.X

(51) Int. Cl.
*H04W 4/00* (2018.01)
*H04L 1/1812* (2023.01)
(Continued)

(52) U.S. Cl.
CPC .......... *H04L 1/1861* (2013.01); *H04L 1/1812* (2013.01); *H04L 1/1825* (2013.01); *H04L 5/0055* (2013.01)

(58) Field of Classification Search
CPC .... H04L 1/1861; H04L 1/1812; H04L 1/1825
See application file for complete search history.

(56) References Cited

U.S. PATENT DOCUMENTS

| 2015/0085750 A1 | 3/2015 | Zhang et al. | |
| 2015/0195072 A1* | 7/2015 | Seo ........................ | H04L 1/1614 370/329 |

(Continued)

FOREIGN PATENT DOCUMENTS

| CN | 102468945 A | 5/2012 |
| CN | 104285396 A | 1/2015 |

(Continued)

OTHER PUBLICATIONS

Ericsson, "Support for Shorter DL SPS Periodicities", 3GPP TSG RAN WG1 Meeting #96bis, R1-1904132, Xi'an, China, Apr. 8-12, 2019.

(Continued)

*Primary Examiner* — Abdelnabi O Musa
(74) *Attorney, Agent, or Firm* — Price Heneveld, LLP

(57) ABSTRACT

Embodiments of this disclosure provide a feedback message sending method and a terminal device. The method includes: in a case that M feedback messages are to be sent in a same time unit, sending an uplink control channel on a target resource in the time unit, where the uplink control channel carries the M feedback messages, the target resource is one of N resources, the N resources are resources configured to send feedback messages, and the M feedback messages are hybrid automatic repeat request HARQ feedback messages for a semi-persistent scheduling physical downlink shared channel PDSCH.

17 Claims, 3 Drawing Sheets

(51) Int. Cl.
*H04L 1/1825* (2023.01)
*H04L 1/1829* (2023.01)
*H04L 5/00* (2006.01)

(56) References Cited

U.S. PATENT DOCUMENTS

| | | | |
|---|---|---|---|
| 2018/0242286 A1* | 8/2018 | Song | H04L 1/0072 |
| 2018/0279274 A1* | 9/2018 | Sun | H04W 52/367 |
| 2019/0103943 A1* | 4/2019 | Wang | H04L 1/1854 |
| 2019/0103947 A1* | 4/2019 | Park | H04L 1/1861 |
| 2019/0109692 A1* | 4/2019 | Gao | H04L 1/1861 |
| 2019/0132093 A1 | 5/2019 | Aiba et al. | |
| 2019/0363840 A1* | 11/2019 | Wang | H04L 1/1864 |
| 2020/0036489 A1* | 1/2020 | Wang | H04L 5/00 |
| 2020/0146018 A1* | 5/2020 | Yan | H04L 5/0055 |
| 2020/0304969 A1* | 9/2020 | Basu Mallick | H04L 5/0055 |
| 2021/0314093 A1 | 10/2021 | Mu | |
| 2022/0240063 A1* | 7/2022 | Basu Mallick | H04L 1/1819 |

FOREIGN PATENT DOCUMENTS

| | | |
|---|---|---|
| CN | 104521156 A | 4/2015 |
| CN | 105991179 A | 10/2016 |
| CN | 107231218 A | 10/2017 |
| CN | 107566097 A | 1/2018 |
| CN | 107733574 A | 2/2018 |
| CN | 108809524 A | 11/2018 |
| CN | 109152007 A | 1/2019 |
| CN | 109155703 A | 1/2019 |
| WO | 2016138778 A1 | 9/2016 |
| WO | 2017187810 A1 | 11/2017 |

OTHER PUBLICATIONS

Intel Corporation, "On UCI enhancements for eURLLC", 3GPP TSG RAN WG1 Ad-Hoc Meeting 1901, R1-1900494, Taipei, Taiwan, Jan. 21-25, 2019.

Samsung, "On scheduling/HARQ enhancements for IIoT", 3GPP TSG RAN WG1 #96bis, R1-1904446, Xi'an, China, Apr. 8-12, 2019.

Samsung, "CR to 38.213 capturing the RAN1#94bis and RAN1#95 meeting agreements", 3GPP TSG RAN WG1 Meeting #95, R1-1814394, Spokane, USA, Nov. 12-16, 2018.

Ericsson, "Remaining Issue of Scheduling/HARQ for NR URLLC", 3GPP TSG-RAN WG1 Meeting #100-bis, Tdoc R1-2001787, e-Meeting, Apr. 20-30, 2020.

OPPO, "UCI enhancements for URLLC", 3GPP TSG RAN WG1 #96bis, R1-1904043, Xi'an, China, Apr. 8-12, 2019.

* cited by examiner

In a case that M feedback messages are to be sent in a same time unit, a terminal device sends an uplink control channel on a target resource in the time unit, where the uplink control channel carries the M feedback messages — 201

FEEDBACK MESSAGE SENDING METHOD AND TERMINAL DEVICE

CROSS-REFERENCE TO RELATED APPLICATIONS

This application is a continuation application of International Application No. PCT/CN2020/087543 filed on Apr. 28, 2020, which claims priority to Chinese Patent Application No. 201910365514.X filed in China on Apr. 30, 2019, which are incorporated herein by reference in their entireties.

TECHNICAL FIELD

Embodiments of this disclosure relate to the field of communications technologies, and in particular, to a feedback message sending method and a terminal device.

BACKGROUND

In a wireless communications system, to ensure reliability of receiving a semi-persistent scheduling (SPS) physical downlink shared channel (PDSCH) by user equipment (UE), after the UE performs an operation of receiving the SPS PDSCH, the UE may have a physical uplink control channel (PUCCH) to carry a hybrid automatic repeat request (HARQ) feedback message for the SPS PDSCH and send the physical uplink control channel to a network device, to feed back to the network device whether the UE successfully receives the SPS PDSCH. Specifically, the UE may send the HARQ feedback message to the network device in a specific time unit after receiving the SPS PDSCH. For example, assuming that the UE receives the SPS PDSCH in an $n^{th}$ time unit, the UE may have the PUCCH carry the HARQ feedback message for the SPS PDSCH in a $k^{th}$ time unit starting from the $n^{th}$ time unit (that is, an $(n+k)^{th}$ time unit) and send the PUCCH to the network device.

However, when the UE receives different SPS PDSCHs in different time units, deviations (that is, k) of sending HARQ feedback messages by the UE to the network device may be different for the different SPS PDSCHs, and therefore, the UE may need to send, to the network device, the HARQ feedback messages for the different SPS PDSCHs in a same time unit. In other words, for the different SPS PDSCHs, values of n+k may be equal. However, the UE can transmit a maximum of only one PUCCH for HARQ feedback in one time unit, that is, time domain resources used by the UE to send to the network device the HARQ feedback messages for the different SPS PDSCHs may conflict (which means that PUCCH resources corresponding to HARQs of the different SPS PDSCHs are within a same time unit, including a case that time domain symbols of a plurality of PUCCH resources overlap or do not overlap), which may cause failure to send HARQ feedback messages for some SPS PDSCHs.

SUMMARY

Embodiments of this disclosure provide a feedback message sending method and a terminal device, to resolve a problem in the related art that sending of feedback messages for some SPS PDSCHs fails due to a conflict between time-domain resources used by a terminal device to send feedback messages for different SPS PDSCHs to a network device.

To resolve the foregoing technical problem, this disclosure is implemented as follows:

According to a first aspect, an embodiment of this disclosure provides a feedback message sending method, applied to a terminal device, where the method includes:

in a case that M feedback messages are to be sent in a same time unit, sending an uplink control channel on a target resource in the time unit, where the uplink control channel carries the M feedback messages; and the target resource is one of N resources, the N resources are resources configured to send feedback messages, the M feedback messages are HARQ feedback messages for a semi-persistent scheduling PDSCH, M is an integer greater than or equal to 2, and N is an integer greater than or equal to M.

According to a second aspect, an embodiment of this disclosure provides a terminal device, where the terminal device includes a sending module;

the sending module is configured to: in a case that M feedback messages are to be sent in a same time unit, send an uplink control channel on a target resource in the time unit, where the uplink control channel carries the M feedback messages; and the target resource is one of N resources, the N resources are resources configured to send feedback messages, the M feedback messages are HARQ feedback messages for a semi-persistent scheduling PDSCH, M is an integer greater than or equal to 2, and N is an integer greater than or equal to M.

According to a third aspect, an embodiment of this disclosure provides a terminal device, including a processor, a memory, and a computer program stored in the memory and capable of running on the processor, where when the computer program is executed by the processor, the steps of the feedback message sending method according to the first aspect are implemented.

According to a fourth aspect, an embodiment of this disclosure provides a computer-readable storage medium, where the computer-readable storage medium stores a computer program, and when the computer program is executed by a processor, the steps of the feedback message sending method according to the first aspect are implemented.

In the embodiments of this disclosure, if the terminal device needs to send a plurality of feedback messages in the same time unit, the terminal device can add the plurality of feedback messages to one uplink control channel for sending, and determine the target resource in which the uplink control channel is located, where the target resource is one of the N resources, and the N resources are the resources configured to send the feedback messages. In this way, in a case that a plurality of feedback messages need to be fed back, the terminal device can send all the feedback messages to the network device correctly, avoiding that some feedback messages cannot be sent correctly, and reducing unnecessary retransmissions of SPS PDSCH resources.

DESCRIPTION OF EMBODIMENTS

Figures 1, 2:
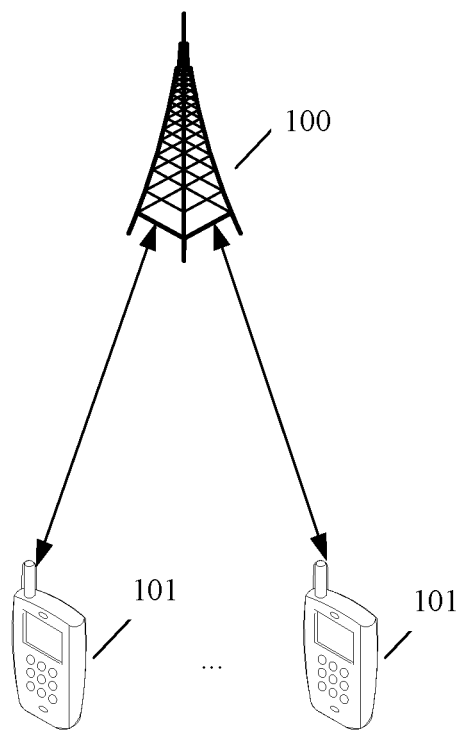
FIG. 1 is a possible schematic structural diagram of a communications system according to an embodiment of this disclosure.
FIG. 2 is a schematic flowchart of a feedback message sending method according to an embodiment of this disclosure.

For ease of understanding, the following provides explanations of some terms in the embodiments of this disclosure:

1. Semi-Persistent Scheduling Physical Downlink Shared Channel SPS PDSCH

During SPS, system resources include uplink and downlink resources, and only need to be allocated or specified once through the physical downlink control channel (PDCCH), and then a same time-frequency resource may be repeatedly used.

Currently, the terminal device configures downlink (DL) semi-persistent scheduling SPS through a field IE SPS-config. The DL SPS can be configured on a primary cell (Pcell) or a secondary cell (Scell). Configured parameters of the DL SPS may include: a DL SPS period, a HARQ process quantity, a PUCCH resource carrying a feedback message AN (ACK/NACK), a modulation and coding scheme (MCS) table, and the like. Generally, the DL SPS configured by the terminal device cannot be used directly, and a network side needs to send PDCCH signaling to activate the DL SPS. The DL SPS can be used only after activation. The network device can use PDCCH signaling to release the DL SPS. After being released, the DL SPS recovers to an unavailable state.

Based on a downlink control information (DCI) format, a radio network temporary identifier (RNTI) used for cyclic redundancy check (CRC), a new data indication (NDI), and a specific field in DCI, it can be determined whether a PDCCH for activating the DL SPS, a PDCCH for releasing the DL SPS, or other DCI is received. For example, when an RNTI corresponding to a used DCI format 1_0 or 1_1 is a CS-RNTI, if the NDI is equal to 0, it indicates the PDCCH for activating or releasing the DL SPS. Then, based on a value of the specific field in the DCI, whether the PDCCH is used for activation or release is determined.

For example, Table 1 is an example table for verifying a specific field in the PDCCH for activating the DL SPS. When values of both a HARQ process indicator field and a redundancy version field in Table 1 are values shown in Table 1, this means that the DL SPS is to be activated. Table 2 is an example table for verifying a specific field in the PDCCH for releasing the DL SPS. When values of a HARQ process indicator field, a redundancy version field, a modulation and coding scheme field, and a frequency resource assignment (frequency domino resource assignment) field in Table 2 are all values shown in Table 2, this indicates the PDCCH for releasing the DL SPS.

TABLE 1

|  | DCI format 1_0 | DCI format 1_1 |
| --- | --- | --- |
| HARQ process indicator | All 0s | All 0s |
| Redundancy version | 00 | For enabling transport block: 00 |

If the network device has activated the DL SPS, the network device can send an SPS PDSCH to the terminal device, and the terminal device needs to send a HARQ-AN to the network device after receiving the SPS PDSCH.

TABLE 2

|  | DCI format 1_0 |
| --- | --- |
| HARQ process indicator | All 0s |
| Redundancy version | 00 |
| Modulation and coding scheme | All 1s |
| Frequency domain resource assignment | All 1s |

If a base station needs to release a resource of the DL SPS, the base station can send, to the terminal device, a PDCCH for instructing the terminal device to release the DL SPS. After receiving the PDCCH, the terminal device needs to feed back AN (ACK/NACK) to the network device. The terminal device may feed back the AN after a specific period of time based on a capability of the terminal device.

It should be noted that in the embodiments of this disclosure, both the HARQ-AN sent by the terminal device to the network device after receiving the SPS PDSCH and the AN fed back by the terminal device to the network device after receiving the PDCCH for instructing the terminal device to release the DL SPS can be referred to as feedback messages of the DL SPS.

2. PUCCH Format

Table 3 is an example table of the PUCCH format.

TABLE 3

| PUCCH format | Capacity | Time domain format | Time domain length |
| --- | --- | --- | --- |
| Format 0 | 2 bits | Short format | 1 or 2 OFDM symbols |
| Format 1 | 2 bits | Long format | 4 to 14 OFDM symbols |
| Format 2 | More than 2 bits | Short format | 1 or 2 OFDM symbols |
| Format 3 | More than 2 bits | Long format | 4 to 14 OFDM symbols |
| Format 4 | More than 2 bits | Long format | 4 to 14 OFDM symbols |

3. DL SPS Feedback Message in NR R15

In NR R15, a format of a PUCCH, configured for the terminal device, for carrying a feedback message is format 1 or format 1 in Table 3. A minimum period of the DL SPS is 10 ms (that is, a time length of 10 slots under a subcarrier spacing of 15 kHz). Currently, the DL SPS can be configured in a maximum of only one serving cell in each serving cell group in NR15. In a time unit, the terminal device only needs to add a 1-bit feedback message to the configured PUCCH. Because a time unit currently scheduled is one slot, even if the minimum period is used, a plurality of feedback messages are not to be sent in a same time unit.

However, to meet service requirements, in time sensitive networking (TSN), a smaller period needs to be configured for a small-period service. In addition, to support a periodic service in a use scenario of ultra-reliable and low latency communications (URLLC), such as power distribution, factory automation, and transportation (including remote driving), the industrial internet of things (IIoT) project has discussed DL SPS enhancement and the need of providing a plurality of different service types for the terminal device and further configuring a plurality of DL SPSs.

If configured DL SPS has a period less than one slot, for example, a DL SPS period is 0.5 ms, assuming that the terminal device receives one SPS PDSCH from the network device every 0.5 ms, two feedback messages may need to be sent within one time unit. In a case that DL SPS periods are different, due to a time deviation and feedback time from the PDSCH to the HARQ, a plurality of feedback messages may need to be fed back within one time unit. However, only one PUCCH can be sent in one time unit. As a result, feedback messages for some SPS PDSCHs may fail to be sent.

Based on the feedback message sending method and the terminal device provided in the embodiments of this disclosure, if the terminal device needs to send a plurality of feedback messages in the same time unit, the terminal device can add the plurality of feedback messages to one uplink control channel for sending, and determine the target resource in which the uplink control channel is located, where the target resource is one of the N resources, and the N resources are the resources configured to send the feedback messages. In this way, in a case that a plurality of feedback messages need to be fed back, the terminal device can send all the feedback messages to the network device correctly, avoiding that some feedback messages cannot be sent correctly, and reducing unnecessary retransmissions of SPS PDSCH resources.

4. Other Terms

The term "and/or" in this specification describes only an association relationship for describing associated objects and means that three relationships may exist. For example, A and/or B may represent the following three cases: only A, both A and B, and only B. In addition, the character "/" in this specification generally represents an "or" relationship between the associated objects. In a formula, the character "/" represents a "divide" relationship between the associated objects. Unless otherwise specified, "a plurality of" in this specification indicates two or more than two.

To clearly describe the technical solutions in the embodiments of this disclosure, terms, such as "first" and "second", are used in the embodiments of this disclosure to distinguish between same items or similar items that have a basically same function or usage. A person skilled in the art may understand that the terms, such as "first" and "second", are not intended to limit a quantity or an execution sequence.

It should be noted that, in the embodiments of this disclosure, terms such as "exemplary" or "for example" are used to represent an example, an instance, or an illustration. Any embodiment or design scheme described as "exemplary" or "for example" in embodiments of this disclosure should not be construed as being more preferred or having more advantages than other embodiments or design schemes. Specifically, the terms such as "an example" or "for example" are intended to present related concepts in a specific manner.

The following describes technical solutions provided in this application with reference to accompanying drawings.

The technical solutions provided in this disclosure may be applied to various communications systems, such as a 5G communications systems, a future evolved system or a plurality of communication fusion systems. A plurality of application scenarios may be included, such as machine to machine (M2M), D2M, macro-micro communications, enhanced mobile broadband (eMBB), ultra-reliable and low latency communications (uRLLC), and massive machine type communication (mMTC). The scenarios include but are not limited to scenarios such as communication between terminal devices, or communication between network devices, or communication between a network device and a terminal device. The embodiments of this disclosure may be applied to communication between a network device and a terminal device, or communication between terminal devices, or communication between network devices in a 5G communications system.

FIG. 1 is a possible schematic structural diagram of a communications system according to an embodiment of this disclosure. As shown in FIG. 1, the communications system includes at least one network device 100 (only one is shown in FIG. 1) and one or more terminal devices 101 connected to each network device 100.

The network device 100 may be a base station, a core network device, a transmission and reception point (TRP), a relay station, an access point, or the like. The network device 100 may be a base transceiver station (BTS) in global system for mobile communications (GSM) or a code division multiple access (CDMA) system, may be an NB (NodeB) in a wideband code division multiple access (WCDMA) system, or may be an eNB or eNodeB (evolved NodeB) in LTE. The network device 100 may alternatively be a wireless controller in a cloud radio access network (CRAN) scenario. The network device 100 may alternatively be a network device in a 5G communications system or a network device in a future evolved network. However, the terms do not constitute a limitation on this disclosure.

The terminal device 101 may be a wireless terminal device or a wired terminal device. The wireless terminal device may be a device providing voice and/or other service data connectivity to a user, a handheld device having a wireless communication function, or a computing device having a wireless communication function, or another processing device connected to a wireless modem, an in-vehicle device, or a wearable device connected to a wireless modem, a terminal device in a future 5G network, a terminal device in a future evolved PLMN network in the future, or the like. The wireless terminal device may communicate with one or more core networks by using a radio access network (RAN). The wireless terminal device may be a mobile terminal device, such as a mobile phone (also referred to as a "cellular" phone) and a computer that is provided with a mobile terminal device, for example, may be a portable mobile apparatus, a pocket-sized mobile apparatus, a handheld mobile apparatus, a computer built-in mobile apparatus, or an in-vehicle mobile apparatus that exchanges voice and/or data with the radio access network, and a device such as a personal communications service (PCS) phone, a cordless telephone set, a session initiation protocol (SIP) phone, a wireless local loop (WLL) station, or a personal digital assistant (PDA). The wireless terminal device may also be a mobile device, user equipment (UE), a terminal device, an access terminal device, a wireless communications device, a terminal device unit, a terminal device station, a mobile station, a mobile console, a remote station, a remote site, a remote terminal device, a subscriber unit, a subscriber station, a user agent, or a terminal device apparatus. As an example, in this embodiment of this disclosure, a terminal device shown in FIG. 1 is a mobile phone.

FIG. 2 is a schematic flowchart of a feedback message sending method according to an embodiment of this disclosure. As shown in FIG. 2, the feedback message sending method provided in this embodiment of this disclosure may include the following steps:

Step 201: In a case that M feedback messages are to be sent in a same time unit, a terminal device sends an uplink control channel on a target resource in the time unit, where the uplink control channel carries the M feedback messages.

The target resource is one of N resources, the N resources are resources configured to send feedback messages, the M feedback messages are HARQ feedback messages for a semi-persistent scheduling PDSCH, M is an integer greater than or equal to 2, and N is an integer greater than or equal to M.

The network device in this embodiment of this disclosure may be a network device in the communications system shown in FIG. 1, for example, a base station; and the terminal device in this embodiment of this disclosure may be a terminal device in the communications system shown in FIG. 1.

It should be noted that the M feedback messages may be feedback messages for M PDSCHs received by the terminal device at different moments in a same semi-persistent scheduling configuration, or may be feedback messages for M PDSCHs received at a same moment or different moments in different semi-persistent scheduling configurations. This is not specifically limited in this embodiment of this disclosure.

It should be noted that the N resources are resources configured by the network device for the terminal device to send AN messages.

For ease of description, in this embodiment of this disclosure, it is assumed that the terminal device is configured with a plurality of semi-persistent scheduling manners.

It should be noted that if DL SPS activated for the terminal device includes DL SPS with a period less than a time unit, a plurality of ANs fed back by the terminal device in the same time unit may include feedback messages of a plurality of PDSCHs corresponding to the DL SPS. If DL SPS activated for the terminal device includes DL SPS 1 and DL SPS 2, a plurality of ANs fed back by the terminal device in the same time unit may include feedback messages of a PDSCH of the DL SPS 1 and a PDSCH of the DL SPS 2.

A plurality of semi-persistent scheduling periods may be partly different, partly the same, all different, or all the same. This is not specifically limited in this embodiment of this disclosure.

In this embodiment of this disclosure, each semi-persistent scheduling period may be less than one time unit, or may be equal to or greater than one time unit.

It should be noted that in this embodiment of this disclosure, the time unit may be one slot or one sub-slot. This is not specifically limited in this embodiment of this disclosure.

For example, DL SPS 1, DL SPS 2, and DL SPS 3 are configured in the terminal device. If the DL SPS 1 is activated, after receiving a PDSCH of the DL SPS 1, the terminal device needs to add AN of the PDSCH to a first PUCCH and send the first PUCCH to the network device; if the DL SPS 2 is activated, after receiving a PDSCH of the DL SPS 2, the terminal device needs to add AN to a second PUCCH and send the second PUCCH to the network device; or if the DL SPS 3 is activated, after receiving a PDSCH of the DL SPS 3, the terminal device needs to add AN to a third PUCCH and send the third PUCCH to the network device.

A PUCCH resource for feeding back AN of each PDSCH may be a PUCCH resource configured to feed back the PDSCH of each DL SPS when the network configures the DL SPS 1, the DL SPS 2, and the DL SPS 3, for example, a PUCCH resource configured through a radio resource control (RRC) parameter $n_1$PUCCH-AN corresponding to each DL SPS.

The first PUCCH, the second PUCCH, and the third PUCCH are PUCCH resources that are configured by the network device during configuration of the DL SPS 1, the DL SPS 2, and the DL SPS 3 and used to feed back the AN of each PDSCH.

Formats of the first PUCCH, the second PUCCH, and the third PUCCH may be partly different, partly the same, all different, or all the same. This is not specifically limited in this embodiment of this disclosure.

Resources used for the first PUCCH, the second PUCCH, and the third PUCCH may be partly different, partly the same, all different, or all the same. This is not specifically limited in this embodiment of this disclosure.

Embodiment 1

Optionally, in this embodiment of this disclosure, in a case that M is equal to 2, the M feedback messages include a first feedback message and a second feedback message, the N resources include a first resource and a second resource, the first resource is a resource configured to send the first feedback message, and the second resource is a resource configured to send the second feedback message.

The target resource is a resource that satisfies a first condition in the first resource and the second resource.

Optionally, the first condition is any one of the following: (1) a resource for sending a target feedback message; (2) a resource with a smaller symbol length in the first resource and the second resource; or (3) a resource with a greater symbol length in the first resource and the second resource.

The target feedback message is a feedback message for a first target shared channel or a feedback message for a second target shared channel; the first target shared channel is a downlink shared channel with an earlier receiving time or a downlink shared channel with a later receiving time in a first downlink shared channel and a second downlink shared channel; the second target shared channel is a downlink shared channel with a smaller configuration index in the first downlink shared channel and the second downlink shared channel; and the first downlink shared channel is a downlink shared channel for the first feedback message, and the second downlink shared channel is a downlink shared channel for the second feedback message.

Optionally, in this embodiment of this disclosure, in a case that M is equal to 2, a capacity of the uplink control channel carrying the M feedback messages is 2 bits.

Further, optionally, a format of the uplink control channel carrying the M feedback messages may be format 0 or format 1.

Optionally, in this embodiment of this disclosure, in a case that M is greater than 2, a capacity of the uplink control channel carrying the M feedback messages is greater than 2 bits.

Further, optionally, a format of the uplink control channel carrying the M feedback messages may be format 2, format 3, or format 4.

For example, the terminal device receives one PDSCH in each of two time units. The two time units are respectively a time unit n1 and a time unit n2. The terminal device receives a first downlink shared channel PDSCH 1 in the time unit n1, adds a first feedback message HARQ-AN 1 of the PDSCH 1 to a first uplink control channel PUCCH 1 in a time unit (n1+k1) that is after the time unit n1, and sends the PUCCH 1; and after receiving a second downlink shared channel PDSCH 2 in the time unit n2, the terminal device needs to add a second feedback message HARQ-AN 2 of the PDSCH 2 to a second uplink control channel PUCCH 2 in the time unit (n2+k2) that is after the time unit n2, and send the PUCCH 2. When the time unit (n1+k1) and the time unit (n2+k2) are the same time unit, a target resource can be specifically determined in the following manner. The resource for the PUCCH 1 configured to carry the HARQ-AN 1 is the first resource, and the resource for the PUCCH 2 carrying the HARQ-AN 2 is the second resource.

Example 1: Assuming that receiving time n1 of the PDSCH 1 is earlier than receiving time n2 of the PDSCH 2, the first target shared channel is the PDSCH 1, and the target feedback message is a feedback message for the PDSCH 1, namely, the HARQ-AN 1, and the target resource is a resource corresponding to the PUCCH 1.

Example 2: Assuming that receiving time n1 of the PDSCH 1 is earlier than receiving time n2 of the PDSCH 2, the first target shared channel is the PDSCH 2, and the target feedback message is a feedback message for the PDSCH 2, namely, the HARQ-AN 2, and the target resource is a resource corresponding to the PUCCH 2.

Specifically, chronological order of receiving time of the PDSCHs may be defined based on a start symbol or an end symbol of the PDSCH.

Example 3: It is assumed that each DL SPS has a corresponding configuration identifier (configuration ID/index), that a configuration identifier of the DL SPS 1 is smaller, and that a configuration identifier of the DL SPS 2 is greater. It can be determined based on values of DL SP identifiers that the second target shared channel is the PDSCH 1 corresponding to the DL SPS 1 with a smaller SPS configuration identifier in PDSCH 1 and PDSCH 2, and the target resource is the resource used by the PUCCH 1.

Example 4: A symbol length of a resource corresponding to the PUCCH 1 is smaller, a symbol length of a resource corresponding to the PUCCH 2 is greater, and therefore, the target resource is the resource used by the PUCCH 1.

Example 5: A symbol length of a resource corresponding to the PUCCH 1 is smaller, a symbol length of a resource corresponding to the PUCCH 2 is greater, and therefore, the target resource is the resource used by the PUCCH 1.

Example 6: A capacity of a PUCCH carrying the HARQ-AN 1 and the HARQ-AN 2 may be 2 bits.

Example 7: A capacity of a PUCCH carrying the HARQ-AN 1 and the HARQ-AN 2 may be greater than 2 bits.

It should be noted that in a case that the capacity of the PUCCH carrying HARQ-AN 1 and HARQ-AN 2 may be greater than 2 bits, when the terminal device sends information less than or equal to 2 bits on the PUCCH resource, a bit quantity can be made greater than 2 through padding or repetition.

Embodiment 2

Optionally, in this embodiment of this disclosure, in a case that M is greater than or equal to 2, the N resources include a third resource and M fourth resources. The third resource is a resource configured to transmit K feedback messages, each fourth resource is a resource configured to transmit one of the M feedback messages, and the target resource is the third resource. K is a preset integer greater than or equal to M.

Optionally, K is a maximum quantity of feedback messages scheduled in a same time unit.

It may be understood that in a same time unit, it is possible that no feedback message needs to be sent, or only one feedback message needs to be sent, or a plurality of feedback messages need to be sent. If K feedback messages need to be sent in the same time unit, the third resource can carry the K feedback messages.

In this embodiment, in a case that M is equal to 2, a capacity of the uplink control channel carrying the M feedback messages is equal to 2 bits.

Further, optionally, in a case that M is equal to 2, a format of the uplink control channel carrying the M feedback messages is either of the following: format 0 or format 1.

In a case that M is equal to 2, a capacity of the uplink control channel carrying the M feedback messages may alternatively be greater than 2 bits. In this case, when the terminal device sends 2-bit information on the PUCCH resource, a bit quantity can be made greater than 2 through padding or repetition.

Specifically, in a case that M is greater than 2, a capacity of the uplink control channel carrying the M feedback messages is greater than 2 bits.

In a case that M is greater than 2, a format of the uplink control channel carrying the M feedback messages is any one of the following: format 2, format 3, or format 4.

Example A: A resource carrying the K feedback messages may be a third resource corresponding to the PUCCH 3; and the M fourth resources are the resource corresponding to the PUCCH 1 carrying the HARQ-AN 1 and the resource corresponding to the PUCCH 2 carrying the HARQ-AN 2. When M feedback messages need to be sent in the same time unit, the terminal device may add the HARQ-AN 1 and the HARQ-AN 2 to the PUCCH 3 of the third resource, and send the PUCCH to the network device.

Optionally, in a case that M is greater than or equal to 2, the N resources include a third resource and M fourth resources. The third resource is a resource configured to transmit K feedback messages, each fourth resource is a resource configured to transmit one of the M feedback messages, and the target resource is a resource that satisfies a first condition in the fourth resources. K is a preset integer greater than or equal to M.

It may be understood that in a case that the configured N resources include the third resource and the M fourth resources, the terminal device may alternatively transmit the M feedback messages by using one of the fourth resources. For example, in a case that the PUCCH corresponding to the fourth resource has sufficient capacity, the fourth resource may be selected as the target resource.

Optionally, in this embodiment of this disclosure, in a case that the third resource includes a plurality of resources, before the uplink control channel is sent on a target resource in the time unit, the method further includes step 202:

Step 202: The terminal device determines the target resource based on a target factor.

The target factor includes at least one of the following: (1) a bit quantity of the M feedback messages; (2) a capacity of each resource in the third resource; (3) a start symbol of each resource in the third resource; or (4) a symbol length of each resource in the third resource.

Example B: Based on a total bit quantity of the feedback message that needs to be fed back, the terminal device may determine, as the target resource, a resource from the M fourth resources that corresponds to a PUCCH capacity greater than or equal to the total bit quantity to be fed back.

Example C: If 2-bit AN information needs to be fed back, the terminal device may select, based on a capacity of each resource in the third resource, a target resource to carry the 2-bit AN information. Different resources in the third resource may be numbered in ascending order of resource capacity. A capacity of a first PUCCH in the third resource is 2 bits, a capacity of a second PUCCH in the third resource is greater than 2 bits, and therefore, the terminal device can determine that a resource corresponding to the first PUCCH is the target resource, that is, the terminal device feeds back the 2-bit AN information on the first PUCCH in the third resource.

Example D: The terminal device may select, as the target resource, a resource with a minimum capacity from a resource with a capacity greater than or equal to M bits in the third resource. Different resources in the third resource may be numbered in ascending order of capacity. A capacity of a first PUCCH in the third resource is C1 bits, a capacity of a second PUCCH in the third resource is C2 bits, a capacity of a third PUCCH in the third resource is C3 bits, C1<C2<C3, C1, C2, and C3 are all positive integers. If the terminal device needs to feed back M-bit information, in a case that M is greater than C1 and less than or equal to C2, the terminal device determines that a resource corresponding to the second PUCCH is the target resource, that is, the terminal device feeds back the M-bit AN information on the resource corresponding to the second PUCCH in the third resource.

Example E: Based on a start symbol of each third resource, the terminal device may select a resource with a smaller start symbol as the target resource, or select a resource with a greater end symbol as the target resource.

Example F: Based on a symbol length of each third resource, the terminal device may select a resource with a greater symbol length as the target resource, or select a resource with a greater end symbol as the target resource.

Generally, the capacity of the resource indicates a maximum quantity of information bits that can be carried on the resource. For example, the terminal device may determine the capacity of the resource based on a product of a quantity of REs that can be used to transmit control information, a corresponding bit rate, and a modulation order of each configured PUCCH resource.

Optionally, the feedback message sending method provided in this embodiment of this disclosure may further include step 203.

Step 203: The terminal device determines a bit sequence of the M feedback messages according to a predetermined rule.

The predetermined rule includes at least one of the following: (1) ascending order of receiving time of downlink shared channels or downlink control channels corresponding to feedback messages; (2) ascending order of configuration identifiers corresponding to downlink shared channels or downlink control channels corresponding to feedback messages; or (3) ascending order of index numbers of serving cells in which downlink shared channels or downlink control channels corresponding to feedback messages are located.

It may be understood that, in this embodiment of this disclosure, in a case that the terminal device needs to send a plurality of feedback messages in the same time unit, to ensure that the network device can correctly obtain a correspondence between ANs of various bits and different PDSCHs, that is, determine a specific PDSCH corresponding to AN with a specific quantity of bits, the terminal device can determine a bit sequence of ANs according to a preset rule, that is, an AN codebook.

For example, the terminal device may determine the AN codebook based on at least one of the following: ascending order of receiving time of the PDSCHs, ascending order of configuration identifiers of DL SPS corresponding to PDSCHs/PDCCHs, or ascending order of index numbers of serving cells in which PDSCHs are located.

For example, when the terminal device configures and activates a plurality of DL SPSs on a plurality of serving cells in a serving cell group, the terminal device can determine the codebook in ascending order of the receiving time of the PDSCHs. If a plurality of PDSCHs need to be fed back on a plurality of serving cells in the same time unit, the terminal device can then sort, in ascending order of serving cell index, ANs fed back simultaneously through PDSCHs on the plurality of serving cells.

In addition, when a period of the DL SPS is less than one slot, such as 0.5 ms, because different PDSCHs can be sent in each period, if a subcarrier spacing is 15 kHz, two PDSCHs may be transmitted in one slot. If the terminal device feeds back, in one slot, namely, slot n+k, the two PDSCHs in the slot according to a related-art solution, different PDSCHs correspond to the same n and k. However, because the terminal device needs time to process and feed back the AN, a value of k cannot be excessively small. For example, k cannot be 0 or 1. This increases latency of feeding back the AN by the terminal device. To reduce the latency of feeding back the AN, the AN may be fed back in the following manner. The terminal device determines time granularity of feeding back the corresponding AN based on the period of the DL SPS. When the period of the DL SPS is less than one slot, the terminal device feeds back the AN based on a sub-slot level. In this case, k represents a quantity of sub-slots. The terminal device receives the PDSCH in sub-slot n and feeds back AN for the PDSCH in sub-slot n+k. In this way, the terminal device can feed back the plurality of PDSCHs in one slot in the same DL SPS at different moments, reducing the latency of feeding back the AN.

In the embodiments of this disclosure, if the terminal device needs to send a plurality of feedback messages in the same time unit, the terminal device can add the plurality of feedback messages to one uplink control channel for sending, and determine the target resource in which the uplink control channel is located, where the target resource is one of the N resources, and the N resources are the resources configured to send the feedback messages. In this way, in a case that a plurality of feedback messages need to be fed back, the terminal device can send all the feedback messages to the network device correctly, avoiding that some feedback messages cannot be sent correctly, and reducing unnecessary retransmissions of SPS PDSCH resources.

It should be noted that the network device may configure, for the terminal device, the target resource for use by the terminal device in the method embodiments.

An embodiment of this disclosure further provides a feedback message receiving method. The method includes the following steps.

Step 001: A network device receives an uplink control channel on a target resource, where the uplink control channel carries M feedback messages, and the M feedback messages are sent by a terminal device in a same time unit.

The target resource is one of N resources, the N resources are resources configured to send feedback messages, the M feedback messages are HARQ feedback messages for a semi-persistent scheduling PDSCH, M is an integer greater than or equal to 2, and N is an integer greater than or equal to M.

In this embodiment of this disclosure, if the terminal device needs to send a plurality of feedback messages in the same time unit, the terminal device can add the plurality of feedback messages to one uplink control channel for sending, and determine the target resource in which the uplink control channel is located, where the target resource is one of the N resources, and the N resources are the resources configured to send the feedback messages. In this way, in a case that a plurality of feedback messages need to be fed back, the terminal device can send all the feedback messages to the network device correctly, avoiding that some feedback messages cannot be sent correctly, and reducing unnecessary retransmissions of SPS PDSCH resources.

Figure 3:
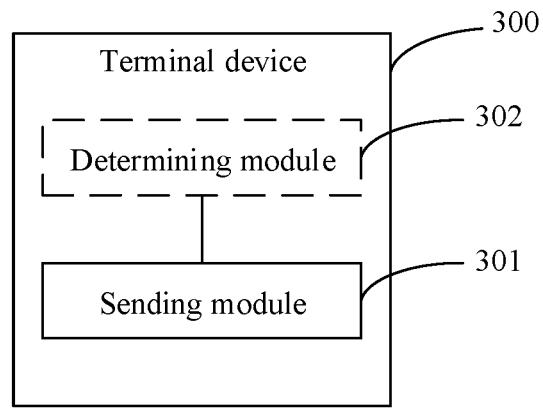
FIG. 3 is a first schematic structural diagram of a terminal device according to an embodiment of this disclosure.

As shown in FIG. 3, an embodiment of this disclosure provides a terminal device 300, and the terminal device 300 includes a sending module 301. The sending module 301 is configured to: in a case that M feedback messages are to be sent in a same time unit, send an uplink control channel on a target resource in the time unit, where the uplink control channel carries the M feedback messages; and the target resource is one of N resources, the N resources are resources configured to send feedback messages, the M feedback messages are HARQ feedback messages for a semi-persistent scheduling PDSCH, M is an integer greater than or equal to 2, and N is an integer greater than or equal to M.

Optionally, in a case that M is equal to 2, the M feedback messages include a first feedback message and a second feedback message, the N resources include a first resource and a second resource, the first resource is a resource configured to send the first feedback message, and the second resource is a resource configured to send the second feedback message; and the target resource is a resource that satisfies a first condition in the first resource and the second resource.

Optionally, the first condition is any one of the following: a resource for sending a target feedback message, a resource with a smaller symbol length in the first resource and the second resource, and a resource with a greater symbol length in the first resource and the second resource; and the target feedback message is a feedback message for a first target shared channel or a feedback message for a second target shared channel; the first target shared channel is a downlink shared channel with an earlier receiving time or a downlink shared channel with a later receiving time in the first downlink shared channel and the second downlink shared channel; the second target shared channel is a downlink shared channel with a smaller configuration identifier in the first downlink shared channel and the second downlink shared channel; and the first downlink shared channel is a downlink shared channel for the first feedback message, and the second downlink shared channel is a downlink shared channel for the second feedback message.

Further, optionally, a capacity of the uplink control channel is 2 bits.

Further, optionally, a format of the uplink control channel is format 0 or format 1.

Optionally, in a case that M is greater than or equal to 2, the N resources include a third resource and M fourth resources, the third resource is a resource configured to transmit K feedback messages, each fourth resource is a resource configured to transmit one of the M feedback messages, and the target resource is the third resource; and K is a preset integer greater than or equal to M.

Optionally, K is a maximum quantity of feedback messages scheduled in a same time unit.

Further, optionally, in a case that M is equal to 2, a capacity of the uplink control channel is equal to 2 bits; or in a case that M is greater than 2, a capacity of the uplink control channel is greater than 2 bits.

Further, optionally, in a case that M is equal to 2, a format of the uplink control channel is either of the following: format 0 and format 1; or in a case that M is greater than 2, a format of the uplink control channel is any one of the following: format 2, format 3, or format 4.

Optionally, as shown in FIG. 3, the terminal device 300 further includes a determining module 302. The determining module 302 is configured to: in a case that the third resource includes at least two resources, before the sending module 301 sends the uplink control channel on the target resource in the time unit, determine the target resource based on a target factor, where the target factor includes at least one of the following: a bit quantity of the M feedback messages, a capacity of each resource in the third resource, a start symbol of each resource in the third resource, or a symbol length of each resource in the third resource.

Optionally, as shown in FIG. 3, the determining module 302 is further configured to determine a bit sequence of the M feedback messages according to a predetermined rule, where the predetermined rule includes at least one of the following: ascending order of receiving time of downlink shared channels corresponding to feedback messages, ascending order of configuration identifiers corresponding to downlink shared channels or downlink control channels corresponding to feedback messages, or ascending order of index numbers of serving cells in which downlink shared channels corresponding to feedback messages are located.

Based on the terminal device provided in this embodiment of this disclosure, if the terminal device needs to send a plurality of feedback messages in the same time unit, the terminal device can add the plurality of feedback messages to one uplink control channel for sending, and determine the target resource in which the uplink control channel is located, where the target resource is one of the N resources, and the N resources are the resources configured to send the feedback messages. In this way, in a case that a plurality of feedback messages need to be fed back, the terminal device can send all the feedback messages to the network device correctly, avoiding that some feedback messages cannot be sent correctly, and reducing unnecessary retransmissions of SPS PDSCH resources.

The terminal device according to this embodiment of this disclosure can implement the process in the foregoing method embodiment. To avoid repetition, details are not described herein again.

Figure 4:
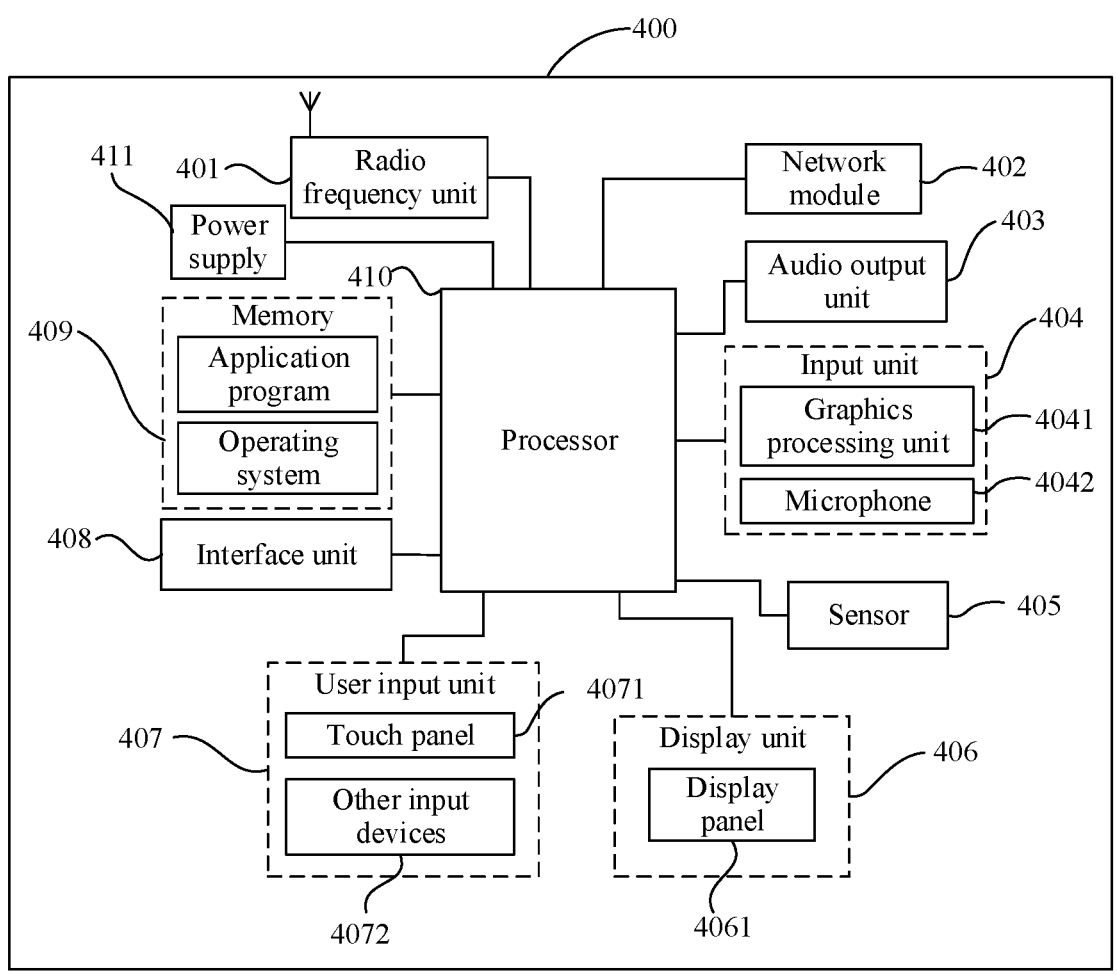
FIG. 4 is a second schematic structural diagram of a terminal device according to an embodiment of this disclosure.

FIG. 4 is a schematic diagram of a hardware structure of a terminal device for implementing the embodiments of this disclosure. The terminal device 400 includes but is not limited to components such as a radio frequency unit 401, a network module 402, an audio output unit 403, an input unit 404, a sensor 405, a display unit 406, a user input unit 407, an interface unit 408, a memory 409, a processor 410, and a power supply 411. A person skilled in the art may understand that the terminal device 400 is not limited to the terminal device structure shown in FIG. 4. The terminal device 400 may include more or fewer components than those shown in the figure, or combine some of the components, or arrange the components differently. In this embodiment of this disclosure, the terminal device 400 includes but is not limited to a mobile phone, a tablet computer, a notebook computer, a palmtop computer, an in-vehicle terminal device, a wearable device, a pedometer, and the like.

The radio frequency unit 401 is configured to: in a case that M feedback messages are to be sent in a same time unit, send an uplink control channel on a target resource in the time unit, where the uplink control channel carries the M feedback messages; and the target resource is one of N resources, the N resources are resources configured to send feedback messages, the M feedback messages are HARQ feedback messages for a semi-persistent scheduling PDSCH, M is an integer greater than or equal to 2, and N is an integer greater than or equal to M.

Based on the terminal device provided in this embodiment of this disclosure, if the terminal device needs to send a plurality of feedback messages in the same time unit, the terminal device can add the plurality of feedback messages to one uplink control channel for sending, and determine the target resource in which the uplink control channel is located, where the target resource is one of the N resources, and the N resources are the resources configured to send the feedback messages. In this way, in a case that a plurality of feedback messages need to be fed back, the terminal device can send all the feedback messages to the network device correctly, avoiding that some feedback messages cannot be sent correctly, and reducing unnecessary retransmissions of SPS PDSCH resources.

It should be understood that in this embodiment of the present disclosure, the radio frequency unit 401 may be configured to receive and send signals in an information reception or transmission or call process. Specifically, after receiving downlink data from a base station, the radio frequency unit 401 sends the downlink data to the processor 410 for processing, and in addition, sends uplink data to the base station. Generally, the radio frequency unit 401 includes but is not limited to an antenna, at least one amplifier, a transceiver, a coupler, a low noise amplifier, a duplexer, and the like. In addition, the radio frequency unit 401 may further communicate with a network and another device through a wireless communications system.

The terminal device 400 provides the user with wireless broadband Internet access by using the network module 402, for example, helps the user send or receive an email, browse a web page, access streaming media, and the like.

The audio output unit 403 may convert audio data received by the radio frequency unit 401 or the network module 402 or stored in the memory 409 into an audio signal and output the audio signal as a sound. In addition, the audio output unit 403 may further provide an audio output (for example, a call signal reception sound or a message reception sound) related to a specific function performed by the terminal device 400. The audio output unit 403 includes a speaker, a buzzer, a telephone receiver, and the like.

The input unit 404 is configured to receive an audio or video signal. The input unit 404 may include a graphics processing unit (GPU) 4041 and a microphone 4042, and the graphics processing unit 4041 processes image data of a still picture or a video obtained by an image capture apparatus (for example, a camera) in an image capture mode or a video capture mode. A processed image frame may be displayed on the display unit 406. An image frame processed by the graphics processing unit 4041 may be stored in the memory 409 (or another storage medium) or sent by the radio frequency unit 401 or the network module 402. The microphone 4042 can receive a sound and can process the sound into audio data. The processed audio data can be converted, for outputting, into a format that can be sent to a mobile communication base station through the radio frequency unit 401 in a telephone call mode.

The terminal device 400 further includes at least one sensor 405, for example, an optical sensor, a motion sensor, and other sensors. Specifically, the optical sensor includes an ambient light sensor and a proximity sensor. The ambient light sensor may adjust luminance of a display panel 4061 based on brightness of ambient light. The proximity sensor may turn off the display panel 4061 and/or backlight when the terminal device 400 moves to an ear. As a type of motion sensor, an accelerometer sensor can detect magnitudes of accelerations in all directions (usually three axes), can detect a magnitude and a direction of gravity when the terminal device is in a static state, and can be applied to posture recognition (such as screen switching between portrait and landscape, related games, and magnetometer posture calibration) of the terminal device, functions related to vibration recognition (such as pedometer and tapping), and the like. The sensor 405 may also include a fingerprint sensor, a pressure sensor, an iris sensor, a molecular sensor, a gyroscope, a barometer, a hygrometer, a thermometer, an infrared sensor, and the like. Details are not described herein.

The display unit 406 is configured to display information input by the user or information provided for the user. The display unit 406 may include the display panel 4061. The display panel 4061 may be configured in a form of a liquid crystal display (LCD), an organic light-emitting diode (OLED), or the like.

The user input unit 407 may be configured to receive input digit or character information, and generate a key signal input related to a user setting and function control of the terminal device 400. Specifically, the user input unit 407 includes a touch panel 4071 and other input devices 4072. The touch panel 4071, also referred to as a touchscreen, may capture a touch operation performed by a user on or near the touch panel (for example, an operation performed by the user on the touch panel 4071 or near the touch panel 4071 by using any appropriate object or accessory such as a finger or a stylus). The touch panel 4071 may include two parts: a touch detection apparatus and a touch controller. The touch detection apparatus detects a touch direction of the user, detects a signal carried by a touch operation, and transmits the signal to the touch controller. The touch controller receives touch information from the touch detection apparatus, converts the touch information to point coordinates, and sends the point coordinates to the processor 410, and receives and executes a command sent by the processor 410. In addition, the touch panel 4071 may be implemented in a plurality of forms, for example, as a resistive, capacitive, infrared, or surface acoustic wave touch panel. The user input unit 407 may further include other input devices 4072 in addition to the touch panel 4071. Specifically, the other input devices 4072 may include but are not limited to a physical keyboard, a function key (such as a volume control key or a power on/off key), a trackball, a mouse, a joystick, and the like. Details are not described herein.

Further, the touch panel 4071 may cover the display panel 4061. After detecting a touch operation on or near the touch panel 4071, the touch panel 4071 transmits the touch operation to the processor 410 to determine a type of a touch event. Then the processor 410 provides corresponding visual output on the display panel 4061 based on the type of the touch event. Although the touch panel 4071 and the display panel 4061 are used as two separate components to implement input and output functions of the terminal device 400 in FIG. 4, the touch panel 4071 and the display panel 4061 may be integrated to implement the input and output functions of the terminal device 400 in some embodiments. This is not specifically limited herein.

The interface unit 408 is an interface for connecting an external apparatus to the terminal device 400. For example, the external apparatus may include a wired or wireless headphone port, an external power supply (or battery charger) port, a wired or wireless data port, a memory card port, a port for connecting an apparatus with an identification module, an audio input/output (I/O) port, a video I/O port, a headset port, or the like. The interface unit 408 may be configured to receive an input (for example, data information or power) from an external apparatus, and transmit the received input to one or more components in the terminal device 400, or may be configured to transmit data between the terminal device 400 device and an external apparatus.

The memory 409 may be configured to store a software program and various data. The memory 409 may mainly include a program storage area and a data storage area. The program storage area may store an operating system, an application program required for at least one function (such as a sound play function and an image play function), and the like. The data storage area may store data (such as audio data and a phone book) created based on use of a mobile phone, and the like. In addition, the memory 409 may include a high-speed random access memory, or may include a non-volatile memory, for example, at least one magnetic disk storage device, a flash memory device, or other volatile solid-state storage devices.

The processor 410 is a control center of the terminal device 400. The processor 410 uses various interfaces and lines to connect all parts of the entire terminal device 400, and performs various functions and data processing of the terminal device 400 by running or executing the software program and/or module stored in the memory 409 and invoking data stored in the memory 409, thereby performing overall monitoring on the terminal device 400. The processor 410 may include one or more processing units. Optionally, the processor 410 may integrate an application processor and a modem processor. The application processor mainly processes an operating system, a user interface, an application program, and the like. The modem processor mainly processes wireless communication. It may be understood that the modem processor may alternatively not be integrated into the processor 410.

The terminal device 400 may further include the power supply 411 (for example, a battery) supplying power to all components. Optionally, the power supply 411 may be logically connected to the processor 410 through a power management system. In this way, functions such as charge management, discharge management, and power consumption management are implemented by using the power management system.

In addition, the terminal device 400 includes some functional modules that are not illustrated. Details are not described herein.

Figure 5:
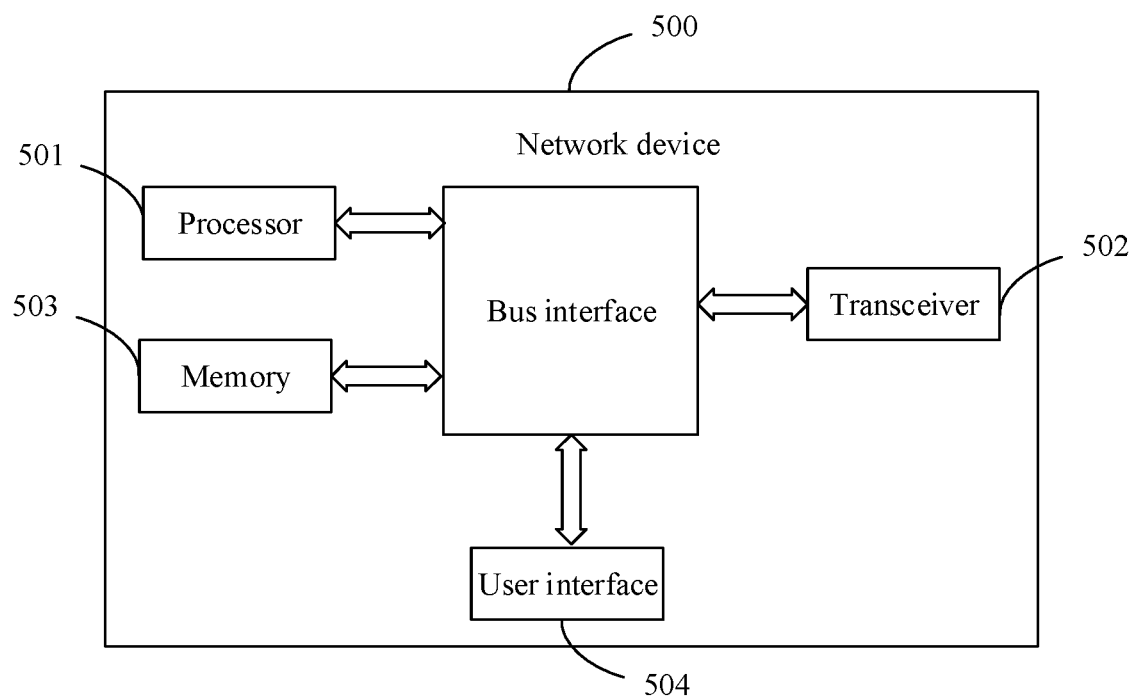
FIG. 5 is a schematic structural diagram of a network device according to an embodiment of this disclosure.

FIG. 5 is a schematic structural diagram of a hardware structure of a network device according to an embodiment of this disclosure. The network device 500 includes a processor 501, a transceiver 502, a memory 503, a user interface 504, and a bus interface.

The transceiver 502 is configured to receive an uplink control channel on a target resource, where the uplink control channel carries M feedback messages, and the M feedback messages are sent by a terminal device in a same time unit. The target resource is one of N resources, the N resources are resources configured to send feedback messages, the M feedback messages are HARQ feedback messages for a semi-persistent scheduling PDSCH, M is an integer greater than or equal to 2, and N is an integer greater than or equal to M.

Based on the network device provided in this embodiment of this disclosure, if the terminal device needs to send a plurality of feedback messages in the same time unit, the terminal device can send an uplink control channel carrying the plurality of feedback messages on the target resource, where the target resource is one of the N resources, and the N resources are the resources configured to send the feedback messages; and the network device receives the uplink control channel. In this way, in a case that the terminal device needs to feed back a plurality of feedback messages, the network device can correctly receive all the feedback messages, avoiding that some feedback messages cannot be sent correctly, and reducing unnecessary retransmissions of SPS PDSCH resources.

In this embodiment of this disclosure, in FIG. 5, a bus architecture may include any quantity of interconnected buses and bridges, and specifically connect together various circuits of one or more processors represented by the processor 501 and a memory represented by the memory 503. The bus architecture may further interconnect various other circuits such as a peripheral device, a voltage regulator, and a power management circuit. These are all well known in the art, and therefore are not further described in this specification. The bus interface provides an interface. The transceiver 502 may be a plurality of elements, including a transmitter and a receiver, and provides units configured to perform communication with various other apparatuses over a transmission medium. For different user equipment, the user interface 504 may also be an interface for externally or internally connecting a required device, and the connected device includes but is not limited to a mini keyboard, a display, a speaker, a microphone, a joystick, or the like. The processor 501 is responsible for management of the bus architecture and general processing, and the memory 503 may store data used by the processor 501 when the processor 501 performs an operation.

In addition, the network device 500 includes some functional modules that are not shown, details of which are not described herein.

Optionally, an embodiment of this disclosure further provides a terminal device, and the terminal device includes a processor, a memory, and a computer program stored in the memory and capable of running on the processor. When the computer program is executed by the processor, the processes of the feedback message sending method in the foregoing embodiments are implemented, and a same technical effect can be achieved. To avoid repetition, details are not described again herein.

An embodiment of this disclosure further provides a computer-readable storage medium. The computer-readable storage medium stores a computer program. When the computer program is executed by a processor, the procedures in the foregoing embodiments of the feedback message sending method are implemented, and a same technical effect can be achieved. To avoid repetition, details are not described herein again. The computer-readable storage medium is, for example, a read-only memory (ROM), a random access memory (RAM), a magnetic disk, or an optical disk.

It should be noted that in this specification, the term "comprise", "include", or any other variant thereof is intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

According to the description of the foregoing implementations, persons skilled in the art can clearly understand that the method in the foregoing embodiments may be implemented by software in addition to a necessary universal hardware platform or by hardware only. In most cases, the former is a more preferred implementation. Based on such an understanding, the technical solutions of this disclosure essentially, or the part contributing to the related art may be implemented in a form of a software product. The computer software product is stored in a storage medium (for example, ROM/RAM, a magnetic disk, or an optical disc), and includes several instructions for instructing a terminal device (which may be a mobile phone, a computer, a server, an air conditioner, a network device, or the like) to perform the feedback message sending method described in the plurality of embodiments of this disclosure.

The embodiments of this disclosure are described above with reference to the accompanying drawings, but this disclosure is not limited to the foregoing implementations. The foregoing implementations are only illustrative rather than restrictive. Inspired by this disclosure, persons of ordinary skill in the art can still derive many variations without departing from the essence of this disclosure and the protection scope of the claims. All these variations shall fall within the protection of this disclosure.

What is claimed is:

1. A feedback message sending method, applied to a terminal device, wherein the method comprises:
   in a case that M feedback messages are to be sent in a same time unit, sending an uplink control channel on a target resource in the time unit, wherein the uplink control channel carries the M feedback messages; and
   the target resource is one of N resources, the N resources are resources configured to send feedback messages, the M feedback messages are hybrid automatic repeat request (HARQ) feedback messages for a semi-persistent scheduling physical downlink shared channel (PDSCH), M is an integer greater than or equal to 2, and N is an integer greater than or equal to M;
   wherein
   the N resources comprise a third resource and M fourth resources, the third resource is a resource configured to transmit K feedback messages, each fourth resource is a resource configured to transmit one of the M feedback messages, and the target resource is the third resource; and
   K is greater than or equal to 2.

2. The method according to claim 1, wherein K is a maximum quantity of feedback messages scheduled in a same time unit.

3. The method according to claim 1, wherein
   in a case that M is equal to 2, a capacity of the uplink control channel is equal to 2 bits; or
   in a case that M is greater than 2, a capacity of the uplink control channel is greater than 2 bits.

4. The method according to claim 3, wherein
   in a case that M is equal to 2, a format of the uplink control channel is either of the following:
   format 0 and format 1; or
   in a case that M is greater than 2, a format of the uplink control channel is any one of the following: format 2, format 3, or format 4.

5. The method according to claim 1, wherein in a case that the third resource comprises a plurality of resources, before the sending an uplink control channel on a target resource in the time unit, the method further comprises:
   determining the target resource based on a target factor, wherein
   the target factor comprises at least one of the following: a bit quantity of the M feedback messages, a capacity of each resource in the third resource, a start symbol of each resource in the third resource, or a symbol length of each resource in the third resource.

6. The method according to claim 5, wherein the method further comprises:
   determining a bit sequence of the M feedback messages according to a predetermined rule, wherein
   the predetermined rule comprises at least one of the following: ascending order of receiving time of downlink shared channels or downlink control channels corresponding to feedback messages, ascending order of configuration identifiers corresponding to downlink shared channels or downlink control channels corresponding to feedback messages, or ascending order of index numbers of serving cells in which downlink shared channels or downlink control channels corresponding to feedback messages are located.

7. A terminal device, comprising a processor, a memory, and a computer program stored in the memory and capable of running on the processor, wherein the computer program is executed by the processor to implement:
   in a case that M feedback messages are to be sent in a same time unit, sending an uplink control channel on a target resource in the time unit, wherein the uplink control channel carries the M feedback messages; and
   the target resource is one of N resources, the N resources are resources configured to send feedback messages, the M feedback messages are hybrid automatic repeat request (HARQ) feedback messages for a semi-persistent scheduling physical downlink shared channel (PDSCH), M is an integer greater than or equal to 2, and N is an integer greater than or equal to M;
   wherein
   the N resources comprise a third resource and M fourth resources, the third resource is a resource configured to transmit K feedback messages, each fourth resource is a resource configured to transmit one of the M feedback messages, and the target resource is the third resource; and
   K is greater than or equal to 2.

8. The terminal device according to claim 7, wherein K is a maximum quantity of feedback messages scheduled in a same time unit.

9. The terminal device according to claim 7, wherein
   in a case that M is equal to 2, a capacity of the uplink control channel is equal to 2 bits; or
   in a case that M is greater than 2, a capacity of the uplink control channel is greater than 2 bits.

10. The terminal device according to claim 9, wherein
    in a case that M is equal to 2, a format of the uplink control channel is either of the following:
    format 0 and format 1; or
    in a case that M is greater than 2, a format of the uplink control channel is any one of the following: format 2, format 3, or format 4.

11. The terminal device according to claim 7, wherein in a case that the third resource comprises a plurality of resources, before the sending an uplink control channel on a target resource in the time unit, the method further comprises:
    determining the target resource based on a target factor, wherein
    the target factor comprises at least one of the following: a bit quantity of the M feedback messages, a capacity of each resource in the third resource, a start symbol of each resource in the third resource, or a symbol length of each resource in the third resource.

12. The terminal device according to claim 11, wherein the computer program is further executed by the processor to implement:
    determining a bit sequence of the M feedback messages according to a predetermined rule, wherein
    the predetermined rule comprises at least one of the following: ascending order of receiving time of downlink shared channels or downlink control channels corresponding to feedback messages, ascending order of configuration identifiers corresponding to downlink shared channels or downlink control channels corresponding to feedback messages, or ascending order of index numbers of serving cells in which downlink shared channels or downlink control channels corresponding to feedback messages are located.

13. A non-transitory computer readable storage medium, wherein the computer-readable storage medium stores a computer program, and the computer program is executed by a processor to implement:

in a case that M feedback messages are to be sent in a same time unit, sending an uplink control channel on a target resource in the time unit, wherein the uplink control channel carries the M feedback messages; and the target resource is one of N resources, the N resources are resources configured to send feedback messages, the M feedback messages are hybrid automatic repeat request (HARQ) feedback messages for a semi-persistent scheduling physical downlink shared channel (PDSCH), M is an integer greater than or equal to 2, and N is an integer greater than or equal to M;

wherein the N resources comprise a third resource and M fourth resources, the third resource is a resource configured to transmit K feedback messages, each fourth resource is a resource configured to transmit one of the M feedback messages, and the target resource is the third resource; and K is greater than or equal to 2.

14. The non-transitory computer readable storage medium according to claim 13, wherein in a case that M is equal to 2, a capacity of the uplink control channel is equal to 2 bits; or in a case that M is greater than 2, a capacity of the uplink control channel is greater than 2 bits.

15. The non-transitory computer readable storage medium according to claim 14, wherein in a case that M is equal to 2, a format of the uplink control channel is either of the following: format 0 and format 1; or in a case that M is greater than 2, a format of the uplink control channel is any one of the following: format 2, format 3, or format 4.

16. The non-transitory computer readable storage medium according to claim 13, wherein in a case that the third resource comprises a plurality of resources, before the sending an uplink control channel on a target resource in the time unit, the method further comprises:

determining the target resource based on a target factor, wherein the target factor comprises at least one of the following: a bit quantity of the M feedback messages, a capacity of each resource in the third resource, a start symbol of each resource in the third resource, and a symbol length of each resource in the third resource.

17. The non-transitory computer readable storage medium according to claim 16, wherein the computer program is further executed by the processor to implement:

determining a bit sequence of the M feedback messages according to a predetermined rule, wherein the predetermined rule comprises at least one of the following: ascending order of receiving time of downlink shared channels or downlink control channels corresponding to feedback messages, ascending order of configuration identifiers corresponding to downlink shared channels or downlink control channels corresponding to feedback messages, or ascending order of index numbers of serving cells in which downlink shared channels or downlink control channels corresponding to feedback messages are located.

* * * * *